United States Patent [19]

Haraguchi

[11] 4,042,942
[45] Aug. 16, 1977

[54] CAMERA WITH MOTOR DRIVE
[75] Inventor: Keisuke Haraguchi, Saitama, Japan
[73] Assignee: Asahi Kogaku Kogyo Kabushiki Kaisha, Japan
[21] Appl. No.: 643,815
[22] Filed: Dec. 23, 1975
[30] Foreign Application Priority Data
Dec. 28, 1974 Japan .................................. 50-3833
[51] Int. Cl.$^2$ .............................................. G03B 1/18
[52] U.S. Cl. .................................. 354/171; 354/173
[58] Field of Search ................ 354/171, 173, 204, 212
[56] References Cited
U.S. PATENT DOCUMENTS

| 3,448,669 | 6/1969 | Suzuki | 354/171 |
|---|---|---|---|
| 3,895,389 | 7/1975 | Arai | 354/173 |

Primary Examiner—John Gonzales
Attorney, Agent, or Firm—Steinberg & Blake

[57] ABSTRACT

A camera which has the capability of having film transported and the shutter cocked by way of a motor drive. The camera has a combined film-transporting and shutter-cocking structure capable of being displaced from a given starting position to an end position for transporting film and cocking the shutter and then being capable of automatically returning to the starting position so as to enable an exposure to be made. A transmission is operatively connected with this combined structure for displacing the latter from its starting to its end position, this transmission being operated by an operating structure which when the combined film-transporting and shutter-cocking structure reaches its end position acts on the transmission to release the latter combined structure so that it will automatically return to its starting position. This operating structure has only a one-way drive connection with the transmission so that it can operate the latter only in one direction. Moreover, the operating structure includes a motor drive which responds automatically to the reaching of the end position by the combined structure for transporting the film and cocking the shutter so as to terminate at this time the operation of the transmission while acting on the transmission to disconnect the latter from the combined structure so as to release the latter to return to its starting position so that an exposure can be made prior to the next driving connection between the transmission and the combined structure for transporting the film and cocking the shutter.

16 Claims, 29 Drawing Figures

CAMERA WITH MOTOR DRIVE

BACKGROUND OF THE INVENTION

The present invention relates to cameras.

In particular, the present invention relates to that type of camera where a structure capable of transporting the film and cocking the shutter is first moved from its starting position to an end position in order to cock the shutter and transport the film with this structure then automatically returning to its starting position so as to enable an exposure to be made.

With the structure of the above type, there is generally a rotary shaft which turns in one direction during cocking of the shutter and film-transporting operations and then turns in the reverse direction to return to its starting position. When a motor-drive is used for operating such a camera, the motor drive must be connected to this shaft in such a way that it is first turned in the one direction for transporting the film and cocking the shutter and is then turned in the opposite direction for return to its starting position. A constuction of this type has the disadvantage of being exceedingly complicated as a result of the requirement of turning the above shaft in opposite directions through the motor drive. Not only is the structure undesirably complex, but in addition the speed with which successive exposures can be made is reduced necessarily by the time required for the transmission to return the shutter-cocking structure to its starting position to enable an exposure to be made. Furthermore, with a construction if the operator desires to use the conventional manual operation of the camera rather than the motor-drive, then it is necessary to disconnect the motor-drive attachment from the camera since otherwise the motor-drive attachment prevents the manaul operation of the camera. It is apparent, therefore that these conventional motor-drives used to enable a series of exposures to be rapidly made one after another have serious drawbacks.

SUMMARY OF THE INVENTION

It is accordingly a primary object of the present invention to provide a camera with a motor-drive which will avoid the above drawbacks.

Thus, it is an object of the present invention to provide a camera with a motor drive which need not return the structure which cocks the shutter and transports the film back to its starting position after acting on this structure to bring about film transport and shutter-cocking.

Also, it is an object of the present invention to provide a structure of the type wherein a motor need only rotate at all times in only one direction.

Furthermore, it is an object of the present invention to provide a construction according to which it becomes possible to operate the camera without utilizing the motor drive and without disconnecting the latter from the camera.

Thus, it is an object of the present invention to provide a construction of the above general type which is far simplier than construction heretofore provided for this purpose and which is much more convenient to use while at the same time being highly reliable in operation.

With the present invention after completion of the film transport and shutter-cocking operations, a disconnection of the drive to the shutter-cocking and film-transporting structure is made, so that this latter structure can automatically return by itself to its starting position, and the transmission to the structure for transporting the film and cocking the shutter is required to operate only in one direction so as to eliminate the time and complicated structure normally required for reverse rotation of the shutter-cocking and film-transporting structure. In this way it is possible to achieve a simplified structure with a high-speed operation. Also it is possible to make exposures independently of the motor-drive.

Thus, according to the invention, the camera has a combined film-transporting and shutter-cocking means which has an end position in which a shutter of the camera is cocked and film of the camera has been advanced to be in position for the next exposure. This latter combined means also has a starting position displaced from its end position and assumed by the combined means for enabling an exposure to be made. A transmission means is operatively connected with the combined means for displacing the latter from its starting to its end position with the combined means at this time transporting the film and cocking the shutter while being displaced by the transmission means from the starting to the end position. This transmission means has the capability of releasing the combined means after the latter has reached its end position so that the combined means will respond to this release from the transmission means to automatically return to its starting position. An operating means is operatively connected with the transmission means for operating the same both to displace the combined means from the starting to the end position and to release the combined means for return from its end position to its starting position. This operating means has only a one-way drive connection with the transmission means for operating the latter in one direction only. The operating means includes a motor-driven drive means for responding automatically to reaching of the end position by the combined means for terminating the operation of the transmission means and for acting on the transmission means to disconnect it from the combined means so as to release the latter for automatic return to its starting position. In this way an exposure can be made prior to the next connection of the transmission means to the combined means and the next operation of the operating means for displacing the combined means from the starting to the end position thereof.

BRIEF DESCRIPTION OF DRAWINGS

The invention is illustrated by way of example in the accompanying drawings which form part of this example and in which.

DESCRIPTION OF PREFERRED EMBODIMENTS

Figure 1:
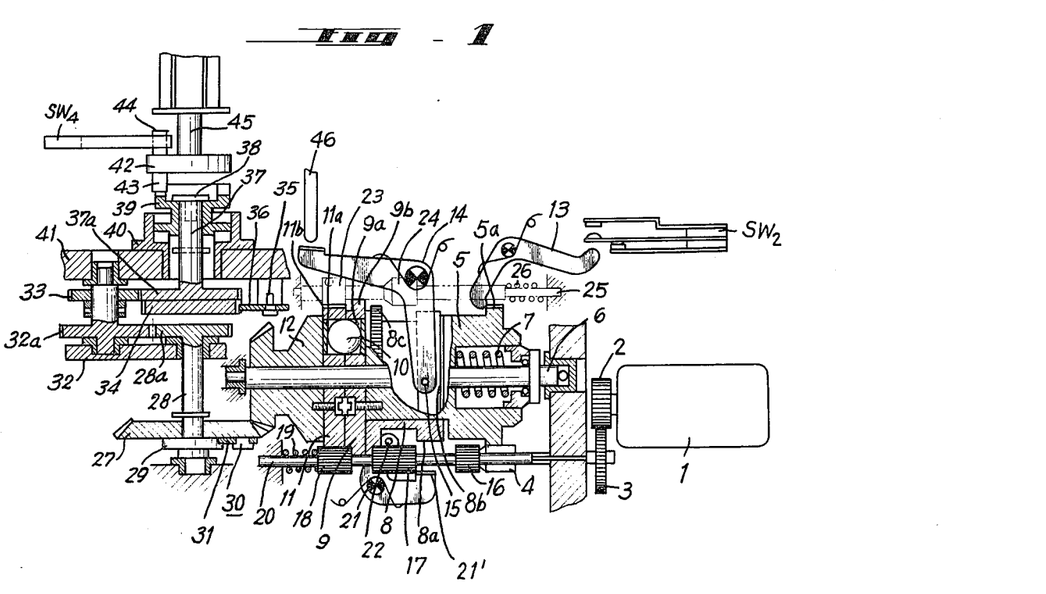
FIG. 1 is a partly schematic and partly sectional elevation of one possible embodiment of the invention.

Referring now to the drawings, and in particular to FIG. 1, there is illustrated therein a driving motor 1 which forms part of an operating means which includes the gear train made up of gears 2, 3, 4, and 5a, the latter gears being driven from the motor 1 in the manner illustrated in FIG. 1. The gear 5a forms part of a rotary drive shaft 5 which is freely turnable on a supporting shaft 6. By way of this supporting shaft 6 the drive shaft is capable not only of rotating about its axis but also of moving axially along the shaft 6. A spring 7 surrounds the shaft 6 and is situated in a recess of the shaft 5, pressing against a surface of the latter as well as a bearing element carried by the shaft 6, so that the spring 7 urges the shaft 5 toward the left, along the shaft 6, as viewed in FIG. 1. The shaft 5 itself supports for free rotation a rotary sleeve 8 which surrounds the shaft 5 and is freely turnable thereon, this sleeve 8 also forming part of the operating means shown at the right in FIG. 1. The rotary sleeve 8 forms a release ring and has at its right end a projecting flange 8a, so that the sleeve 8 forms a rotary flange element. The flange 8a is interrupted by a cutout 8b shown most clearly in FIGS. 4B, 5B and 6B. At its left end, as viewed in FIG. 1, the rotary shaft 5 has rigidly fixed thereto a driving plate 9. This plate 9 forms and end plate of the rotary shaft 5 and is rigidly fixed to the shaft 5 by one or more suitable screws, as illustrated in FIG. 1.

The above components 5, 8 and 9 of the operating means of FIG. 1 form a input assembly, and this input assembly of the operating means cooperate with an output assembly of the operating means through a slip-joint transmission which includes a steel ball 10. The steel ball 10 is situated partly in an aperture 9a of the end plate 9 of the rotary input assembly, and when the rotary input assembly is in driving engagement with the rotary output assembly, the steel ball 10 is also situated partly within a recess 11a of an end plate 11 of the rotary output assembly of the operating means. This rotary output assembly includes in addition to the end plate 11 a rotary bevel gear 12 to which the end plate 11 is fixed also by one or more suitable screws. Thus, when the end plates 9 and 11 of the rotary input and output assemblies, respectively, are situated directly next to each other the steel ball 10 of the slip-joint means is situated in both of the recesses 9a and 11a and serves to transmit the drive from the input assembly to the output assembly of the operating means which includes both of these assemblies. It will be noted that the rotary bevelled gear 12 together with the end plate 11 of the output assembly are also supported for free rotation by the shaft 6.

Figure 24:
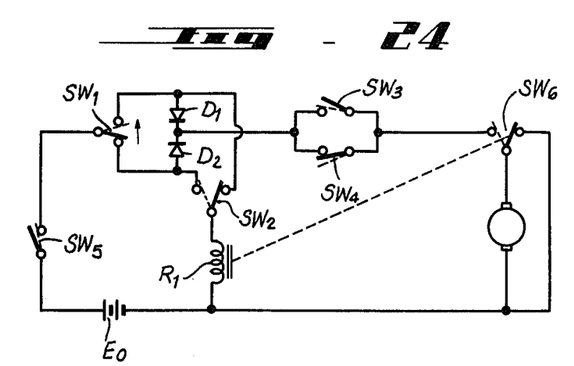
FIG. 24 is a schematic wiring diagram of the electrical structure.

The motor 1 of FIG. 1 is indicated by the motor M in the circuit of FIG. 24, and it will be seen that this circuit includes a switch $SW_2$ which is illustrated at the upper right of FIG. 1. The switch $SW_2$ is controlled by way of a switch lever 13 which is pivotally mounted on a stationary pin of the structure. A spring is connected with the lever 13 to continuously urge the latter in a counterclockwise direction, as viewed in FIG. 1. As a result the lower end of the lever 13 is maintained in engagement with the left end surface of the gear 5a which projects from the shaft 5. Thus, when the parts have the position of FIG. 1, the switch $SW_2$ will have the position shown in FIG. 1. However, when the shaft 5 shifts to the right from the position of FIG. 1 to the position of FIG. 2, in a manner described below, the spring which acts on lever 13 will swing the latter in a counterclockwise direction so that the switch $SW_2$ will then assume the position shown in FIG. 2 for a purpose referred to below.

FIG. 1 also illustrates an actuating means 14 for actuating a shutter-tripping means 46. Thus, the elongated pin or rod 46 is guided for vertical movement and when raised from the position of FIG. 1 will trip a shutter of the camera in a well known manner. This actuation of the shutter-tripping means 46 is brought about by the actuating means which is formed by the lever 14 which is also supported for swinging movement about a stationary pin of the structure. A spring also acts on the lever 14 so as to continuously urge the latter in a counterclockwise direction, as viewed in FIG. 1. However, this counterclockwise movement of the lever 14 is limited by a stationary stop pin which is indicated in FIG. 1 at the upper left portion of a gear 23 which is referred to below. In other words this stop pin does not form part of the gear 23 but it is in line with the latter in the illustration of FIG. 1. The stop pin which limits the counterclockwise turning of the lever 14 is fixedly carried by a stationary part of the structure. The end of the lever 14 which is distant from the shutter-tripping means 46 carries a pin 15 which projects perpendicularly from the lever 14 and which is situated next to the flange 8a of the flanged rotary ring 8, for a purpose referred to below. It will be noted that in FIGS. 5B and 6B, the pin 15 is shown in the gap 8b formed in the flange 8a, while in FIG. 4B the pin 15 is out of line with the gap 8b.

Situated in front of and parallel to the gear 4, as viewed in FIG. 1, is a rotary shaft 20 which is supported for free rotation by bearing structure carried by the stationary supporting frame of the illustrated casing, so that in the illustration of FIG. 1 the gear 4 is shown behind the shaft 20. This shaft 20 is also supported for axial shifting movement as well as rotary movement. Fixed to the shaft 20 is a gear 16 which comes into mesh with the gear 4 when the shaft 20 shifts to the right from the position shown in FIG. 1. The shaft 20 also fixedly carries a gear 17 which normaly does not mesh with a gear 8c situated at the left end of the flanged element 8, as viewed in FIG. 1. Thus, the teeth of the gear 8c which is integral with and projects from the ring 8 are interrupted so as to form a gap 8d, indicated in phantom lines in FIGS. 4B and 6B, and normally the gear 17 is situated in the gap 8d which forms an interruption in the teeth of the gear 8c. However, during part of the operation the gear 8c will turn together with the flanged element 8 so as to come into mesh with the gear 17, in a manner described below.

The shaft 20 also fixedly carries a gear 18 which normally meshes with an outer peripheral gear portion 11b of the end plate 11 of the rotary output assembly 11, 12 of the operating means of FIG. 1. Between the gear 18 and a stationary surface of the shaft 20 is surrounded by a compressed spring 19 which acts through the gear 18 on the shaft 20 to urge the latter toward the right, as viewed in FIG. 1. Thus, the compression spring 7 urges the shaft 5 toward the left in FIG. 1 while the compression spring 19 urges the shaft 20 toward the right in FIG. 1. The end plate 9 has peripheral projecting portion 9b which overlaps and engages the right end face of the gear 18 so that through this peripheral portion 9b of the end plate 9 the movement of the shaft 20 to the right by the spring 19 is limited.

Adjacent the gear 17 there is a lever 21 supported for rotary movement by a stationary pivot pin and having one end which in the position of lever 21 in FIG. 1 engages the right end of the gear 17 so as also to limit the movement of the gear 17 and the shaft 20 to the right as viewed in FIG. 1. The end of the lever 21 distant from its portion 21' which is situated at the right end of the gear 17 carries a pin 22 adapted to be engaged by the right end of the projecting gear portion 8c of the rotary flanged element 8, so that when the latter shifts together with the shaft 5 to the right, the lever 21 will be turned to the position shown in FIG. 2 in opposition to a spring which acts on the lever 21 to urge the latter in a counterclockwise direction as viewed in FIGS. 1 and 2, thus lowering the portion 21' of the lever 21 away from the path of movement of the gear 17, as is apparent from a comparison of FIGS. 1 and 2. Thus, when the rotary input assembly is shifted to the right from the position of FIG. 1 to the position of FIG. 2, the lever 21 will be turned in a clockwise direction, moving the projection 21' thereof away from the path of movement of the gear 17.

As was pointed out above, situated behind the stop pin which limits the turning of the actuating lever 14 is a rotary gear 23, and this gear 23 normally is in mesh with the outer peripheral gear portion 11b of the end plate 11 of the output assembly of the operating means of FIG. 1. This gear 23 is fixed together with a gear 24 to a rotary supporting shaft 25, and while the gear 24 normally is out of mesh with the gear portion 8c of the flanged element 8, when the latter shifts to the right together with the shaft 5 the gear 24 meshes with the gear portion 8c, as is apparent from FIG. 2. The shaft 25 is surrounded by a spring 26 which urges the shaft 25 together with the gears 23 and 24 fixed thereto toward the left, as viewed in FIG. 1.

Figures 4A, 4B:
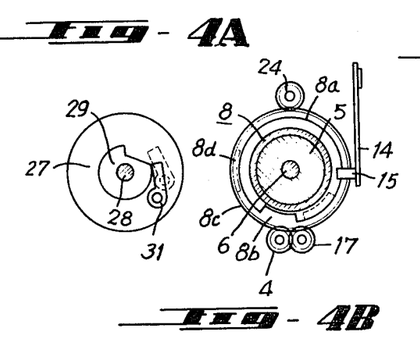
FIG. 4A is a schematic plan view of part of the structure of FIG. 3, taken along line 4A-4A of FIG. 3 in the direction of the arrows.
FIG. 4B is a transverse section of part of the structure of FIG. 3 taken along line 4B—4B of FIG. 3 in the direction of the arrows.
Figures 5A, 5B:
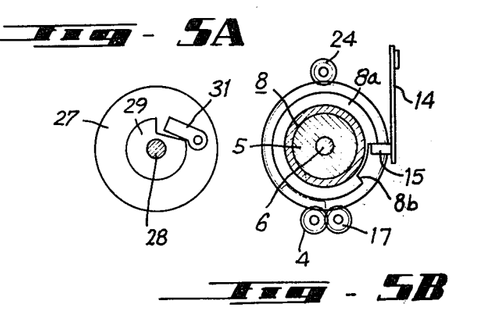
FIG. 5A shows the structure of FIG. 4A in another position.
FIG. 5B shows the structure of FIG. 4B in another position.
Figures 6A, 6B:
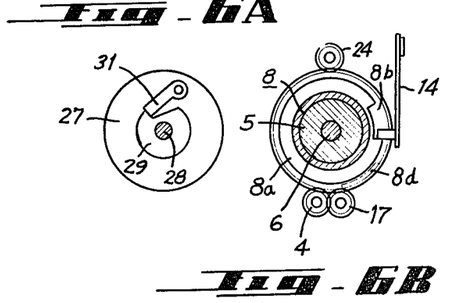
FIG. 6A shows the structure of FIGS. 4A and 5A in a still further position.
FIG. 6B shows the structure of FIGS. 4B and 5B in a still further position.

The bevel gear 12 of the rotary output assembly meshes with a rotary bevel gear 27 which has a central opening through which an upright shaft 28 freely passes so that the bevel gear 27 is freely turnable on the shaft 28, this shaft 28 forming part of a transmission means which is operated by the operating means described above. The rotary output assembly of the operating means has only a one-way drive connection with the shaft 28 of the transmission means shown at the left of FIG. 1, and this one-way drive connection is provided by way of a ratchet mechanism 30. This mechanism includes a swingable ratchet element 31 supporting at the lower surface of the bevelled gear 27 for turning movement thereon, and the ratched 31 is adapted to cooperate with a ratchet wheel 29 which is fixed to the lower end of the shaft 28 just above a bearing at the bottom of the shaft 28 which supports the latter for rotary movement about its axis. It will be noted that the ratchet mechanism is illustrated in FIGS. 4A, 5A, and 6A.

The transmission means which includes the shaft 28 also includes the gear 28a which is fixed to the shaft 28 as well as a gear 32a which meshes with the gear 28. This gear 32a in turn is coaxially fixed with a gear 33 which meshes with a gear 37a, and the gear 37a in turn is fixed to a shaft 37 which is coaxial with the shaft 28, this latter train of elements forming part of the transmission means. The transmission means serves to transmit the one-way drive to a combined film-transporting shutter-cocking means which is fragmentarily illustrated in FIG. 1 and includes the rotary shaft 45 which is coaxial with the shafts 28 and 37 and which has fixed to its bottom end a disc 42 carrying a transmission pin 43 adapted to be received in one of a plurality of recesses of an end member 39 of the transmission means. In a manner which is well known in the art, when the shaft 45 turns in a given direction it will serve to operate both a film-transporting means and a shutter-cocking means which are conventional and well known, this shaft 45 itself forming together with the parts connected thereto part of the shutter-cocking and film-transporting means which are combined together. Thus, in the position of end member 39 illustrated in FIG. 1, this end member 39 serves to connect the transmission means extending between shaft 28 and member 39 to the pin 43 for transmitting through the latter a drive to the combined shutter-cocking and film-transporting means. The end member 39 while capable of shifting vertically along the shaft 37 is constrained to rotate therewith. It is to be noted that the structure described above up to the end member 39 forms part of an attachment, for example, which may be attached to a camera so as to provide a motor drive for the camera, whereas the pin 43, element 42 and the shaft 45 and the remaining structure connected thereto forms part of the permanent structure of the camera and is capable of being operated manually in a conventional manner in order to bring about cocking of the shutter and transportation of the film.

While the above transmission means can only be driven in one directon as a result of the one-way drive connection formed by the ratchet mechanism 30, the casing structure 41 also carries a ratchet mechanism 35 having a ratchet member 36 pivotally carried by a stationary part of the casing 41 and cooperating with a ratchet wheel 34 which is fixed coaxially to the gear 37a, so that this structure also will prevent a reverse rotation of the shaft 37. The end member 39 is supported in a bearing 40 fixed to the casing 41. The disc 42 is integral with and forms part of the shutter-cocking and film-transporting means, this disc 42 actually being fixed to the bottom end of the shaft 45. At its upper surface the disc 42 carries a pin 44 which is provided for controlling a switch $SW_4$ in the manner described below. The coupling pin or transmission pin 43 which cooperates with the end member 39 is coaxial with the switch-operting pin 44. Of course both of these pins are fixed to the disc 42 at a given radial distance from the shaft 45.

The structure described above operates as follows:

FIG. 1 illustrates the structure in the position it takes when attached to the main body of the camera. At this time the ratchet mechanism 30, the flanged ring 8, and the actuating lever 14 are in the position shown in FIGS. 6A and 6B. The structure includes the circuitry of FIG. 24 which has a manually operable switch $SW_1$ in the form of a suitable pushbotton, for example, and this switch $SW_1$ is in the solid line position shown in FIG. 24 at this time. In this condition of initial attachment to the camera body the circuitry of FIG. 24, forming an electrical circuit means connected to the motor, has the switches $SW_2$, $SW_3$ and $SW_4$, described below, situated in the dotted line positions. The circuitry includes a current source $E_o$, and the circuit is energized upon closing the current-source switch $SW_5$. With the parts in the above position and with the closing of the switch $SW_5$, the relay $R_1$ will become energized, so that the relay switch $SW_6$ will be moved from the solid to the dotted line position shown in FIG. 24, thus energizing the motor M of FIG. 24 corresponding to the motor 1 of FIG. 1. Therefore, the operating means operates through the rotary input and rotary output assemblies described above to transmit through the motor-driven drive means power all the way up the shutter-cocking and film-transporting means 45. This transmission takes place from the motor 1 through the gears 2, 3, 4, 5a, 12, 27, 28a, 32a, 33 and 37. Of course when the shaft 37 turns the end member 38 turns therewith and because at this time the transmission pin 43 is received in a recess of the end member 39, the latter acts through the pin 43 to turn the disc 43 and the shaft 45, thus bringing about cocking of the shutter and transportation of the film.

When the film has been transported through a distance equivalent to a single film frame and when the shutter has at the same time been cocked, there will be a considerable resistance to further turning of the shaft 45, with the result that an excessive load is applied to the end plate 11 of the rotary output assembly. However, because the drive continues through the rotary input assembly to the end plate 9 thereof, while there is this resistance to turning of the end plate 11 of the rotary output assembly, the slip-joint means which includes the steel ball 11 reacts automatically by causing the ball 11 to move out of the recess 11a displacing the rotary input assembly along the shaft 6 away from the rotary output assembly while the ball 10 now rolls along the right surface of the plate 11, as viewed in FIG. 2. Thus, through this automatic reaction of the slip-joint structure continued transmission of the drive to means 45 is avoided and the combined means 45 is thus operated only to the extent necessary for advancing the film and cocking the shutter, with the slip-joint which includes the ball 10 acting automatically to terminate the drive after these operations have been performed by the combined shutter-cocking and film-transporting means.

Figure 2:
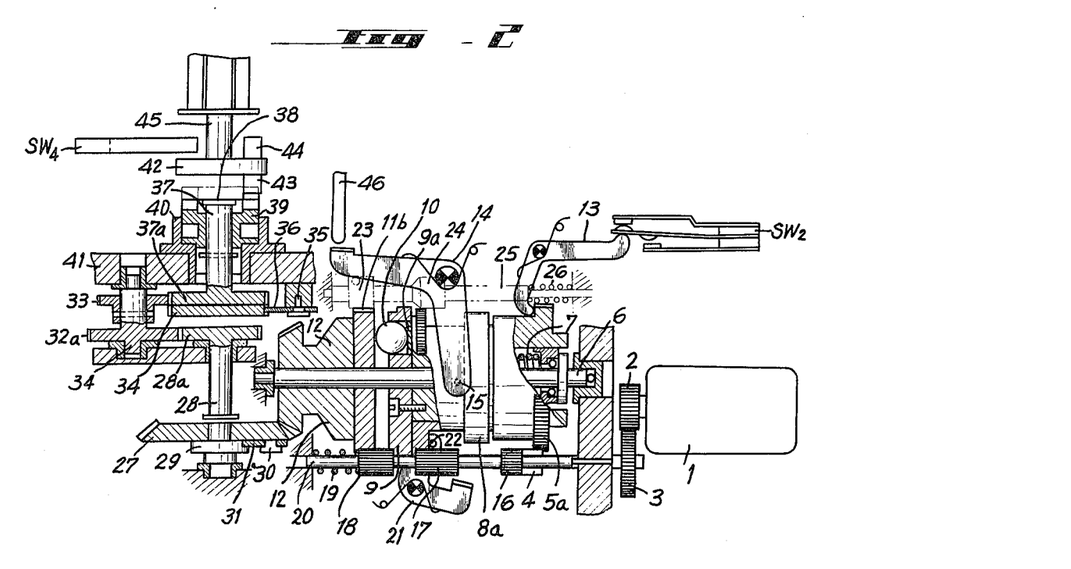
FIG. 2 shows the structure of FIG. 1 in the position where a drive to a shutter-cocking and film-transporting means has terminated.

Thus, the movement of the ball 10 out of the recess 11a will push the plate 9 to the right from the position of FIG. 1 to the position of FIG. 2 against the action of the spring 7, and of course the entire rotary input assembly is shifted in this way along the shaft 6. In this way the parts will assume the position shown in FIG. 2.

Referring to FIG. 2 it will be seen that this movement of the rotary assembly has caused the right end of the peripheral gear portion 8c to turn the lever 21 in the manner described above so as to shift the part 21' thereof out of the path of movement of the gear 17. Thus, it is now possible for the spring 19 to expand and shift the shaft 20 together with the structure carried thereby to the right from the position of FIG. 1 to the position of FIG. 2. As a result the gear 16 is displaced into mesh with the gear 4, and since the flanged ring 8 has also shifted to the right, the gear portion 8c thereof comes into mesh with the gear 24. As a result there is now a drive from the motor 1 through the gears 2–4 to the gear 16 which rotates the shaft 20 so as to drive the gear 18 which now rotates the end plate 11 so as to act through the gear portion 11b thereof on the gear 23 for rotating the shaft 25 which now through the gear 24 turns the ring or flanged element 8. As a result the toothless part 8d of the gear portion 8c moves beyond the gear 17 and the toothed portion of the gear 8c now engages the gear 17. The result of the above operations is that the plate 11 which was previously coupled to the motor 1 through the shaft 5 is now coupled to the motor 1 through the shaft 20 and is driven in a direction which is the reverse of its direction of rotation when driven through the shaft 5. Also, through the above transmission, which includes the gears 11b, 23 and 24, to the release ring or flanged element 8, the latter is also rotated in a direction which is the reverse to that of the direction of rotation to the shaft 5. Furthermore it is to be noted that the movement of the flanged element 8 to the right has displaced the flange 8a thereof beyond the pin 15 so that when the element 8 is rotated as described above, the gap 8b becomes displaced out of alignment with the pin 15 with the flange 8a now being situated to the right of the pin 15, as viewed in FIG. 2.

As was described above, the movement of the shaft 5 to the right from the position of FIG. 1 to the position of FIG. 2 releases the lever 13 to the force of the spring acting thereon so that the switch $SW_2$ is changed over from the position of FIG. 1 to the position of FIG. 2. As a result, the switch $SW_2$ is displaced from the dotted to the solid line position shown in FIG. 24. This changeover of the switch $SW_2$ at the end of the shifting movement of the rotary input means opens the circuit of the relay $R_1$, so that the switch $SW_6$ returns to the solid line position shown in FIG. 24, and the motor drive is terminated. Thus, the circuitry shown at the right of FIG. 24 constitutes a motor-stopping circuit. It will be seen therefore, that the drive of the components of the rotary input assembly is terminated after a certain amount of reverse rotation has taken place as set forth above, with the parts now having the position shown in dotted lines in FIGS. 4A and 4B.

Figure 7:
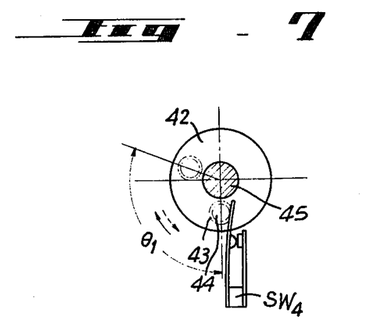
FIG. 7 is a partly schematic sectional illustration of part of the structure of FIG. 3 taken along line 7—7 of FIG. 3 in the direction of the arrows.

In a manner which is described below, when the steel ball 10 moves out of the recess 11a of the end plate 11, or even slightly before this instant, the end member 39 is displaced downwardly from the position of FIG. 1 to the solid line position shown in FIG. 2, so that the coupling between the transmission means and the combined shutter-cocking and film-transporting means is interrupted. In this way the transmission means is disconnected from the combined shutter-tripping and film-transporting means. The top surface of the coupling member 39 becomes situated below the bottom end of the transmission pin 43 at this time. The combined shutter-cocking and film-transporting means 45 includes in a well known manner a return spring which always seeks to return this combined means to the starting position shown in FIG. 1. In fact, as is well known, after conventional actuation of the shutter-cocking and film-transporting structure, this structure must return from the end position to which it is moved in order to cock the shutter and advance the film to its starting position in order to enable film in the camera to be exposed. Thus, after the combined film-transporting and shutter-cocking structure has been displaced from the starting position of FIG. 1 to the end position of FIG. 2, the disconnection of the transmission means from this combined means enables the latter to return automatically to its starting position shown in FIG. 1. This action is also illustrated in FIG. 7 which clearly shows how when the pin 43 returns to its starting position it closes the switch $SW_4$. Thus, the parts now are in a position for making an exposure.

In order to trip the shutter, the operator will manually actuate the push-button switch $SW_1$ shown in FIG. 24. During this manual operation the switch $SW_1$ will be transferred from the solid to the dotted-line position shown in FIG. 24. Inasmuch as the switch $SW_2$ has now been displaced by the lever 13 to the solid line position shown in FIG. 24, it is clear that this manual operation of the switch $SW_1$ will again serve to energize the relay $R_1$ so that the switch $SW_6$ is again displaced to the dotted line position shown in FIG. 24, and the motor 1 is now energized. At this time the switches $SW_3$ and $SW_4$ are in the solid line positions indicated in FIG. 24. Thus, with the motor now operating the drive which previously terminated with the operation of the switch $SW_2$ by the lever 13 will continue. Thus, the plate 11, together with the gear 12, and the flanged element 8 will continue their reversed rotation with respect to the drive plate 9 and the shaft 5. As a result of this continued reverse rotation, the relationship between the element 8 and the lever 14 and between the ratchet wheel 29 change from the dotted to the solid line positions indicated in FIGS. 4A and 4B. The continued reversed rotary movement of the end plates 9 and 11 one with respect to the other now causes the recess 11a of the end plate 11 to come into line with the ball 10 so that the latter enters this recess, and the spring 7 expands to bring the parts into the position shown in FIG. 3. Of course, the flanged element 8 of the rotary input assembly will shift to the left together with the shaft 5 thereof. Since the gap 8b is out of line with the pin 15 and the flange 8a is situated to the right of the pin 15, this return movement of the input assembly will cause the flanged element 8 to act on the actuating means formed by the lever 14 so as to turn the latter in a clockwise direction causing the actuating means 14 to actuate the shutter-tripping means 46, so that this return of the rotary input assembly into driving engagement with the rotary output assembly brings about tripping of the shutter and making of an exposure.

Moreover, as the rotary input assembly returns to its position of driving engagement with the rotary output assembly, the peripheral portion 9b of the end plate 9 acts on the gear 18 to shift the latter together with the shaft 20 in opposition to the spring 19 to the left, thus disengaging the gear 16 from the gear 4. In this way the reverse drive is terminated.

Figure 3:
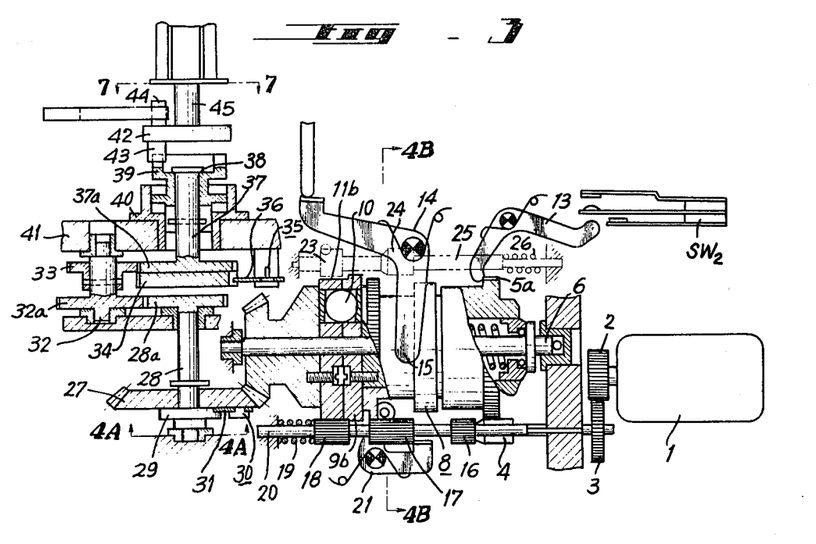
FIG. 3 illustrates the position in which the parts of FIG. 2 take when the shutter is tripped to make an exposure.

At the same time, the left end of the gear portion 5a turns the lever 13 in a clockwise direction to the position of FIG. 3, so that the switch $SW_2$ returns to the position of FIG. 1, or in other words to the dotted line position shown in FIG. 24. As a result the relay $R_1$ is rendered non-conductive, and thus the switch $SW_6$ will return to the solid-line position of FIG. 24 terminating the operation of the motor when the parts have the position shown in FIG. 3.

At the same time, when the ball 10 is again received in the recess 11b with the return of the rotary input assembly into driving engagement with the rotary output assembly, the end member 39 of the transmission means is moved back up to the position shown in FIG. 3, in a manner described below, thus receiving the pin 43 in a recess of the end member 39 of the transmission means, so that at this time the transmission means is again connected with the combined shutter-tripping and film-transporting means. At this time a complete cycle of operations up to exposure of film has been completed.

The manually operable switch $SW_1$ in the form of a push button, is spring-pressed toward the solid line position shown in FIG. 24, so that when the operator releases the switch $SW_1$ it will return back to the solid line position shown in FIG. 24. Since the switch $SW_2$ has returned to the dotted line position shown in FIG. 24, the relay $R_1$ is again energized, and the operations described above in connection with FIG. 1 are now repeated with respect to again operating automatically the combined shutter-tripping and film-transporting means. Of course, due to the drive from the bevel gear 27, the ratchet 31 moves from the position of FIG. 4A to the position of FIG. 5A, and during the initial part of this operation the gear 11b drives the gear 18 and at the same time the drive is transmitted from the gear 17 to the gear portion 8c of the flanged element 8. As a result this latter flanged member is driven during the initial part of this operation with the result that the gap 8b comes into angular alignment with the pin 15, turning up to the elevation of the latter, so that the pin 15 which previously was acted upon by the left end of the flange 8a now moves into the gap 8b of the flange 8a. The entry of the pin 15 into the gap 8b is illustrated in FIG. 5. As a result, the spring which acts on the lever 14 turns the latter in a counterclockwise direction, as viewed in FIG. 3, back to the position illustrated in FIG. 1, and thus the shutter-tripping means returns to its initial position. Of course, after the pin 15 enters into the gap 8b, as shown in FIG. 5B, the ring 8 continues to turn until the interrupted portion 8d of the teeth 8c reach the gear 17, and at this time the pin 15 engages the opposite end of the cutout 8b, as is apparent from a comparison of FIG. 5B with FIG. 6B.

A complete cycle of operations is thus completed at this time and the structure is in a position ready for the next exposure upon actuation of the manual switch SW$_1$. Thus, the release of this latter switch has brought about automatically movement of the structure from the position of FIG. 1 to the position of FIG. 2.

It is to be noted that at this time the end member 39 of the transmission means has been displaced downwardly out of driving engagement with the pin 43. Thus, the operator can make the next exposure by manipulating the switch SW$_1$, as described above. However, if desired, the operator can proceed now to make an exposure in the usual manner from the usual shutter-tripping plunger of the camera and can operate the combined shutter-tripping and film-transporting structure from the conventional camera structure provided for this purpose, without any interference from the attachment of the invention because the end member 39 is out of driving engagement with the pin 43. Therefore, with the present invention it is not required for the operator to remove the motor drive attachment from the camera in order to operate the latter when desired in a conventional manner without using the motor drive.

Figure 8:
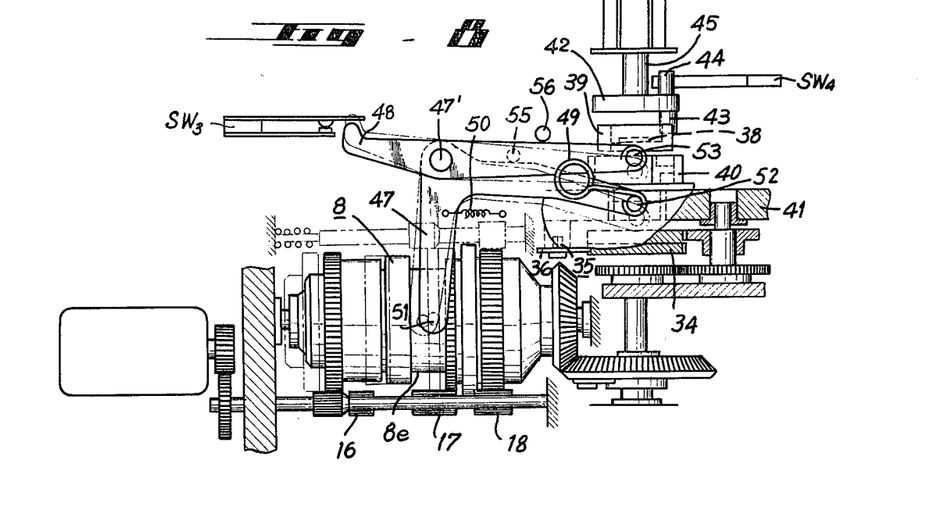
FIG. 8 is a view of the structure of FIG. 1 as seen from the side thereof which is not visible in FIG. 1.

Referring now to FIG. 8, the structure of FIGS. 1-3 is illustrated as it appears from the side opposite from FIGS. 1-3, in order to illustrate the structure for disconnecting the transmission means from the combined shutter-tripping and film-transporting means as well as for controlling the switches SW$_3$ and SW$_4$.

For the purpose of automatically disconnecting the transmission means from the combined shutter-tripping and film-transporting means, at the proper time, a lever means is actuated by the flanged member 8 of the rotary input assembly. In the example of FIG. 8 the lever means includes a pair of levers 47, and 48 which are pivotally connected to each other by way of a pivot pin 47'. The latter pivot pin is a stationary pin which supports both of the levers 47 and 48 for swinging movement about a common axis. The lever 48 is a substantially straight lever while the lever 47 is a bell crank lever. A pin 51 is fixed to one end of the lever 47 and is situated in the recess 8e of the flanged member 8, between the flanges situated at the opposed ends of the member 8. As will be apparent from the description below, the position of the pin 51 is such that in response to movement of the flanged member 8, during movement of the rotary input assembly away from the output assembly as a result of the action of the slip-joint means, for turning the lever 47 in a clockwise direction, as viewed in FIG. 8, from the solid to the dot-dash line position. In other words, the pin 51 is situated in the path of movement of the gear portion 8c to be engaged by an end surface of this gear portion so as to be turned in response to movement of the member 8 from the solid to the dot-dash line position shown in FIG. 8. The other end of the lever 47 carries a pin 52 engaged by one end of a spring 49, the other end of which engages a pin 53 which is fixed to the right end of the lever 48, as viewed in FIG. 8. The spring 49 seeks to move the pins 52 and 53 toward each other. The lever 48 fixedly carries a pin 55 which engages an upper edge of the lever 47 so as to limit the extent to which the spring 49 can move the pins 52 and 53 toward each other, and in this way when the pin 55 engages the upper edge of the lever 47, the levers 47 and 48 act effectively as a single lever. A spring 50 is connected at one end to a stationary part of the structure and at its opposite end to the lever 47 so as to urge both of the levers 47 and 48, which now act as a unitary lever, in a counterclockwise direction about the pin 47'. This movement is limited by a stationary stop pin 56 which engages the upper edge of the lever 48, as indicated in FIG. 8. As shown most clearly in FIG. 9, the pin 53 which is fixed to the right end of the lever 48 carries an extension 54, and this extension 54 extends into an annular groove 39b of the member 39, this annular groove 39b being shown most clearly in FIG. 10. The end of the lever 48 distant from the pin 53 is situated adjacent the switch SW$_3$ for operating the latter in a manner described below.

Figure 9:
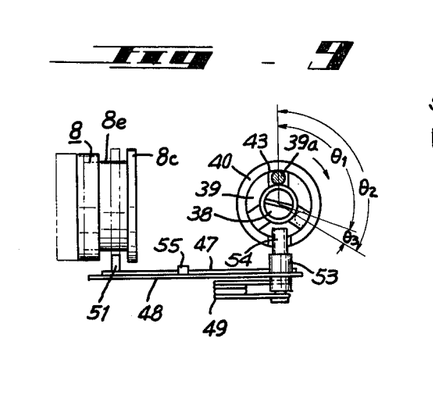
FIG. 9 is a schematic plan view of part of the structure of FIG. 8 illustrating how a lever is actuated and cooperates with a transmission to connect and disconnect the latter.
Figures 13, 14:
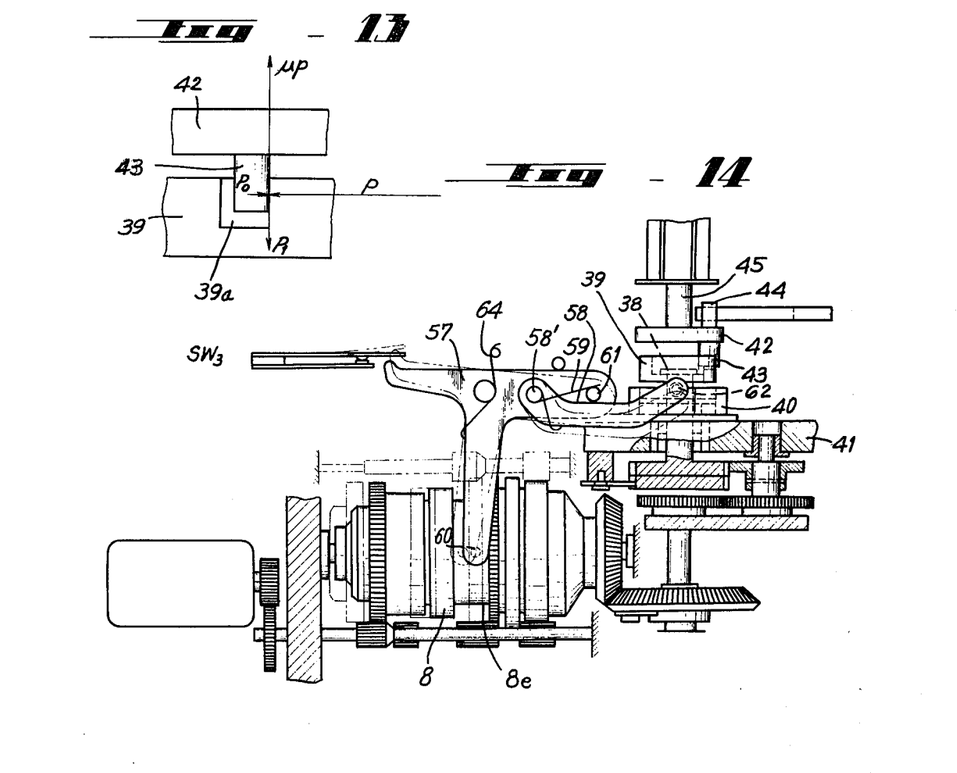
FIG. 13 is a schematic force diagram showing how part of the transmission structure operates.
FIG. 14 is a view of another embodiment of the invention for actuating a switch and controlling the connection between the stransmission and the structure for transporting film and cocking the shutter.

The transmission of rotary movement by way of the above-described transmission means to the combined film-transporting shutter-cocking means 45 by way of the end member 39 takes place with the latter turning through the angle $\theta_2$ indicated in FIG. 9. This turning of course terminates as pointed out above because of the excessive load exerted on the rotary output assembly 11, 12 with the result that the steel ball 10 moves out of the recess 11a, as described above. At this time also the member 8 moves to the left, as viewed in FIGS. 8 and 10. Accordingly, the pin 51 is pushed by the end surface of the gear 8c, so that the lever 47 rotates in a clockwise direction in opposition to the spring 50. Thus, the pin 53 which is fixed to the lever 48 will tend at this time to displace the end member 39 downwardly so as to disconnect the transmission means from the combined film-transporting and shutter-cocking means. During the movement of the steel ball 10 out of the recess 11a of the end plate 11 of the rotary output means, the force resulting from compression of the spring 7 is transmitted to the plate 11 through the recess 9a of the end plate 9, the steel ball 10, and the recess 11a of the plate 11. In this way there is provided through the transmission means a rotary driving force P indicated in FIG. 13, this force P acts at the line of engagement in the recess 39a of end member 39 between the transmission pin 43 and the end member 39. This rotary driving force P is of such a great value that it is in fact somewhat greater than the maximum driving power of the camera for advancing the film, and this force is converted into a vertical component as the friction force up inciated in FIG. 13. Therefore, while the force P remains, even though the spring 49 tends to act on the pin 53 for displacing end member 39 downwardly, the upwardly directed component of the force P indicated in FIG. 13 prevents such downward movement of the member 39. Thus, the lever 47 will continue to rotate as a result of the movement of the flanged member 8 and the spring 49 will be tensioned to a greater degree while the pin 53 remains in the groove 39b. The downwardly directed force P$_1$ exerted by the spring 49 and indicated in FIG. 13 is much smaller than the upward component up indicated in FIG. 13.

However, as was pointed out above, upon completion of the movement of the ball 10 out of the recess 11a, the transmission of rotary movement to the plate 11 is carried out in a reverse direction of rotation. By way of the one-way drive in the form of the ratchet mechanism 30, the frictional force of engagement up between component 39 in the recess 39a thereof and the transmission pin 43 will disappear at this time. Therefore, at this time the force P$_1$ of the spring 49 will become effective and opposes the returning force P$_0$ of the coupling pin 43 seeking to return the shutter-cocking and film-transporting means to its starting position, and thus the pin 53 will now be effective to displace end member 39 downwardly to disconnect the transmission means from the transmission pin 43, and now under the action of the force $P_0$ the pin 43 together with the shaft 45 will return to its starting position.

The lever 48 will now turn in a clockwise direction, as viewed in FIG. 8, due to the action of the spring 49 as described above, so that not only does the pin 53 bring about disconnection of the transmission means from the combined shutter-tripping and film-transporting means but in addition the left part of the lever 48, as viewed in FIG. 8, acts on the switch $SW_3$ so as to open this switch. Thus, simultaneously with the downward movement of the end member 39 the switch $SW_3$ is opened. As is indicated in FIG. 7, when the pin 43 returns to its starting position, it engages and closes the normally open switch $SW_4$. As is apparent from FIG. 24, these switches $SW_3$ and $SW_4$ are connected in parallel in the circuit which energizes the motor. However, as is apparent from the above description both of these switches $SW_3$ and $SW_4$ are open during the time interval between completion of the film advance and shutter-cocking operation and return of the pin 43 to its starting position, so that during this latter interval it is not possible to energize the motor. In this way it is possible to prevent an accidental starting of the operation of the motor prior to completion of the return of the pin 43 to its starting position, this return of the pin 43 to its starting position, being required for proper operation of the shutter, as pointed out above.

Figure 25:
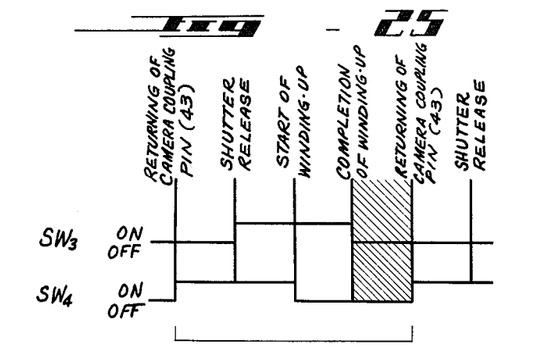
FIG. 25 is a time chart illustrating the operation of a pair of switches of FIG. 24

FIG. 25 is a time chart illustrating the operation of the switches $SW_3$, $SW_4$. The various positions of the switches during the various parts of the cycle of operations is illustrated. In the shaded area it will be noted that both of the switches are simultaneously open, this shaded area indicating the interval between completion of winding up of the film and return of the camera coupling pin 43 to its starting position, so that at this particular time interval it is not possible to start the motor.

Thus, at this time the switch $SW_4$ has been closed by the pin 43, the switch $SW_2$ has been displaced to the solid line position shown in FIG. 24, as described above in connection with FIG. 2, and thus when the operator manipulates the manually operable switch $SW_1$, an exposure will be made as described above. In other words at this time the motor will be energized to bring about operation of the actuating means 14 which actuates the shutter-tripping means 46 as described above. As was also pointed out above, during the release action the plate 11 as well as the bevel gears 12 and 27 are driven in the reverse direction and due to the action of the ratchet mechanism 30, the driving power is not transmitted to the end member 39 and the transmission means is not operated. During the reverse rotation of the bevel gear 27, as a result of the friction the reversed rotary movement tends to be transmitted but this is prevented as a result of the reverse-rotation preventing ratchet mechanism 35. Thus, as was indicated in FIG. 12, at the end of the operations in connection with advancing the film and cocking the shutter the end member 39 has been lowered so as to be disengaged from the coupling pin 43.

As pointed out above, the plate 11 and the plate 9 will rotate in mutually reversed directions of rotation and the shutter-tripping operations initiated by manual operation of the switch $SW_1$ are completed when the ball 10 is again received in the recess 11a, this ball remaining in the recess 9a. This return of the rotary input means into driving engagement with the rotary output means of course causes the flanged member 8 to move to the right, as viewed in FIG. 12, so that the pin 51 becomes disengaged from the end surface of the 8c and the lever 47, positioned adjacent the recess 8e is turned together with the lever 48 as a result of the action of the pin 55, in a counterclockwise direction due to the force of the spring 50. As a result, the pin 53 of lever 48 will now act to raise the end member 39 back to its position of driving engagement with the pin 43. Referring to FIG. 9, it will be seen that the end member 39 is provided with recesses 39a at locations which are angularly spaced equidistantly from each other about the axis of the end member 39. Thus, the recesses 39a which receive the pin 43 are equidistantly spaced from each other by equal angular distances $\theta_2$ indicated in FIG. 9, this distance including the additional angle $\theta_3$ with respect to the angle $\theta_1$, so that while the member 39 is turned through these equal angular increments at each cycle of operation, the pin 43 turns with the member 39 but then returns to become situated over the recess 39a immediately preceding the recess occupied by the pin 43 when it was driven, with the result that when the pin 43 returns to its starting position it is automatically situated over a recess 39a to be received therein when the end member 39 is raised.

Figure 10:
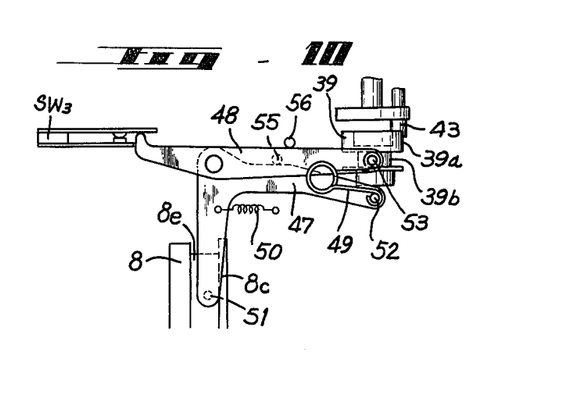
FIG. 10 shows part of the structure of FIG. 8 in a position for actuating a switch and the transmission.
Figure 11:
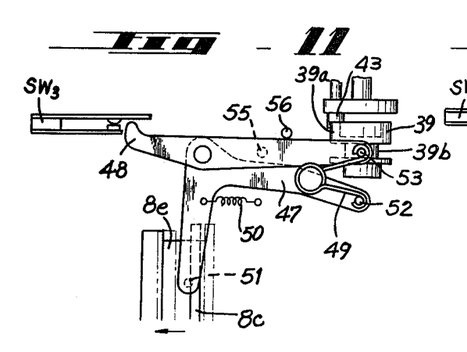
FIG. 11 shows part of FIGS. 10 in a further position taken during the operation of the structure.
Figure 12:
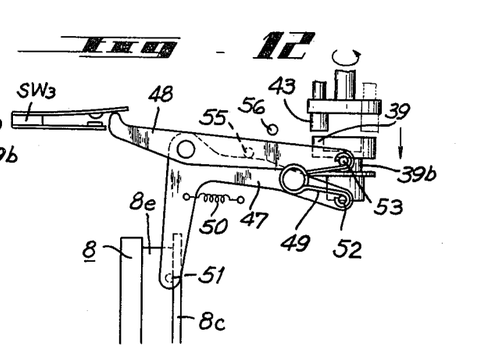
FIG. 12 shows a still further position of the structure after it has the position of FIG. 11.

FIG. 11 shows the position which the parts take between the positions of FIGS. 10 and 12 when even though the lever 47 has been turned, the forces shown in FIG. 13 and described above still maintain the end member 39 in its upper position.

Figure 15:
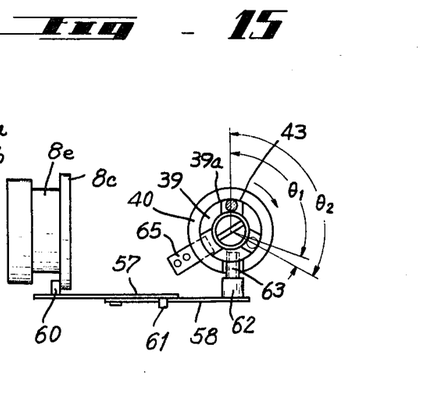
FIG. 15 is a schematic plan view showing how a lever structure of FIG. 14 operates.
Figure 16:
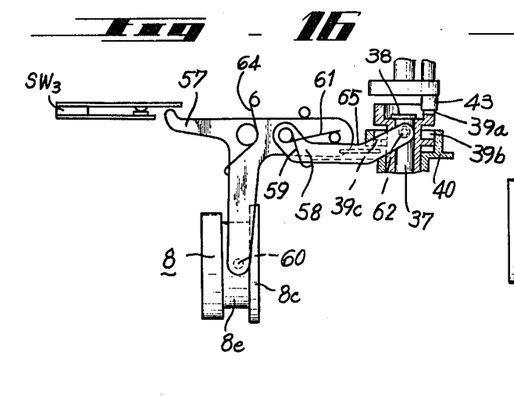
FIG. 16 is an elevation showing this lever structure of FIG. 15 in a predetermined position.

FIG. 14 illustrates another embodiment of this part of the structure of the invention. Thus, in FIG. 14 the lever means takes the form of a T-shaped lever 57 which is pivoted on a stationary pin of the casing 41. The lever 57 carries a pin 60 which is situated in the recess 8e in the same way as the pin 51 referred to above. This lever 57 carries at its right end, as viewed in FIG. 14, a pin 61 and also the lever 57 carries a pivot pin 58' for the second lever 58 of the lever means 57, 58 of this embodiment. By way of a spring 59, the lever 58 is urged upwardly, as viewed in 14, into engagement with the pin 61. Moreover, a spring 64 acts on the lever 57 to urge the latter into engagement with a stationary stop pin engaging the upper edge of the lever 57 adjacent the right end thereof as illustrated in FIG. 14. The opposed or left end of the lever 57, as viewed in FIG. 14 is situated adjacent the switch $SW_3$ in order to operate the latter. The second lever 58 carries at its right end a pin 62 which has, as shown in FIG. 15, an extension 63 which is received in the groove 39b of the end member 39 as described above in connection with the extension 54 of the pin 53. In this embodiment, however, the lower portion 39c of end member 39 is formed with recesses having the same angular relationship with respect to each other as the recesses 39a and being respectively in alignment therewith. A stationary stop member 65, shown most clearly in FIG. 15, is adapted to be received in one of these recesses which are respectively in alignment with the upwardly directed recesses 39a.

Figure 17:
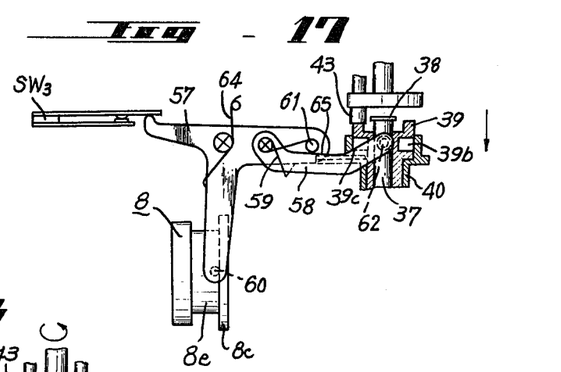
FIG. 17 shows the structure of FIG. 16 in a further position.

This embodiment operates as follows:

Upon completion of the film advance and shutter-cocking operation, the film advance is of course terminated. As pointed out above, the driving power P acts at the point of engagement between the member 39 at a recess 39a thereof and the transmission pin 43. When the slip joint provides the disconnection of the rotary input assembly from the rotary output assembly of the operating means as described above, the flanged member 8 of course moves to the left, as viewed in FIG. 14, so that now the left side surface of the gear portion 8c pushes the pin 60 of the lever 57, thus rotating the latter in a clockwise direction, as viewed in FIG. 14, in opposition to the spring 64. As a result, the lever 58 which now is effectively a single lever with the lever 57, due to the action of the pin 61, is also rotated in a clockwise direction together with the lever 57. Therefore, the pin 62 will at its extension 63 push down on the member 39 in the annular groove 39b thereof, in the direction of the arrow shown at the right in FIG. 17. As is shown in FIG. 17, the recessed lower end portion 39c of end member 39 is in such position that the member 65 enters one of the recesses at the lower part of the end member 39, and as was indicated above in connection with FIG. 9, the angular distance $\theta_2$ is somewhat greater than the actual winding and cocking angle $\theta_1$, so that when the member 39 is pushed down at this time the stop member 65 will be received with some clearance in one of the downwardly directed recesses of end member 39.

Figure 18:
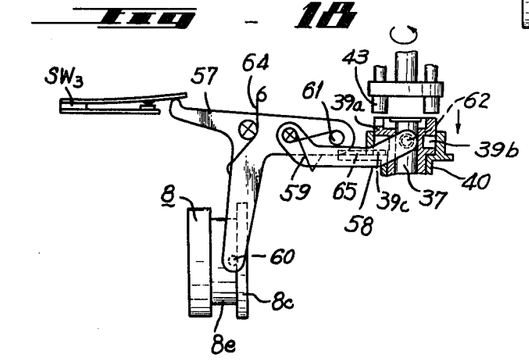
FIG. 18 shows the structure of FIG. 17 in a still further position taken after it has the position of FIG. 17.

Just before completion of the movement of the steel ball 10 out of the recess 11a, the end member 39 is disconnected from and moves downwardly beyond the transmission pin 43, so that the end member 39 is released and as a result of the action of the spring 7 the steel ball 10 tends to return into the recess 11a. However, inasmuch as an end edge of one of the recesses at the lower part 39c of end member 39 abuts against the fixed stop 65, the ball 10 returns into the recess 11a to return the rotary input means to its position of driving engagement with the rotary output means, and at the same time the left part of the lever 57, as viewed in FIG. 14, opens the switch $SW_3$ as indicated in FIG. 18. In other words with this embodiment at the end of the film-advancing and shutter-cocking operations, the stop 65 will be received in a recess at the lower portion 39c of member 39 and due to clearance which this recess has with respect to the stop 35, the parts can move beyond the position of FIG. 17 into the position of FIG. 18 with the result that the disconnection of the transmission means from the pin 43 is completed and the switch $SW_3$ is opened as indicated in FIG. 18.

As pointed out above, when the end member 39 becomes disengaged from the pin 43, the latter returns automatically to its initial position and closes the switch $SW_4$. The switches $SW_3$ and $SW_4$ are operated in this embodiment in the same way as in the previous embodiment. The only difference between the embodiment of FIG. 14 and that of FIG. 8 resides in the fact that during movement of the gear portion 8c away from the pin 60 of lever 57 when the rotary input means returns to its position of driving engagement with the rotary output means, accompanied by entry of the ball 10 into the recess 11a, the lever 47 rotates in a counterclockwise direction due to the action of the spring 64 but this return swinging of the lever 57 does not in itself return the member 39 up to its position of engagement with the pin 43. Instead this action is brought about by way of the spring 59 which turns the lever 58 with respect to the lever 57 in order to return member 39 to its upper position.

Figure 19:
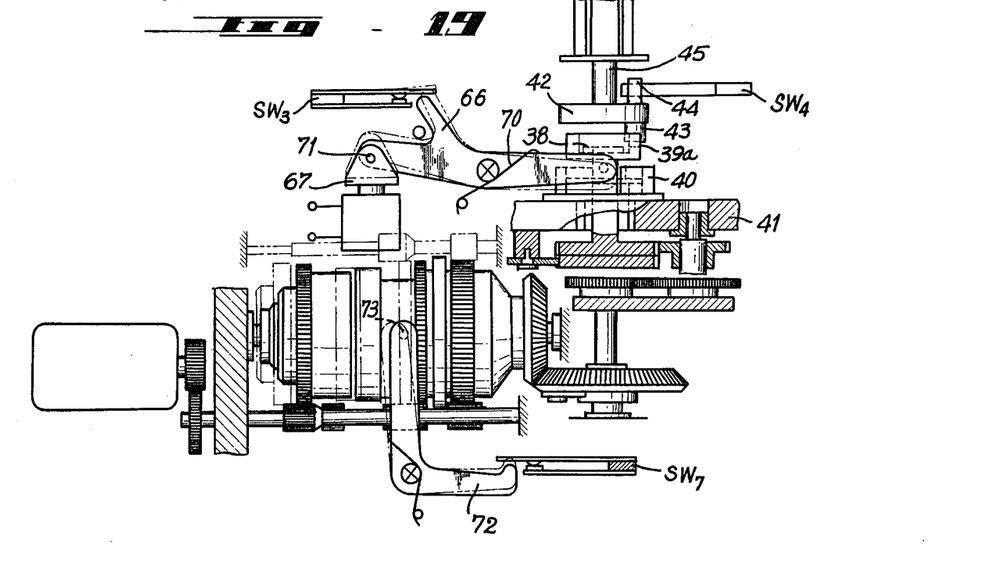
FIG. 19 is a view of a still further embodiment of the invention for controlling the transmission of a drive to the structure for transporting film and cocking the shutter as well as for controlling a switch.

A third embodiment of the invention is illustrated in FIG. 19. In this embodiment the lever means includes a solenoid-actuated lever 66 and a lower lever 72. The upper lever 66 is pivotally supported intermediate its ends on a stationary pivot pin fixed to a stationary part of the casing 41. The lever 66 is urged to turn in a clockwise direction by the spring 70, as viewed in FIG. 19. A pin 68 is fixed to the right end of the lever 66 and has an extension 69 received in the groove 39b, as shown in FIGS. 20-23. The opposite end of the lever 66 swingably carries by way of a pivot pin 71 an armature 67 which is adapted to be attracted by an electromagnet $R_2$, this electromagnet having a core situated beneath the armature 67. The lever 66 also has at the region of its left end an upwardly directed extension for operating the switch $SW_3$.

The lower lever 72 is also pivoted on a stationary pin of the casing 41 and at its upper end carries a pin 73 extending into the recessed portion 8e of the flanged member 8, so as to be acted upon by the left surface of the gear portion 8c thereof as described above in connection with the pin 60 of FIG. 14. The opposed end of the lever 72 is positioned with respect to a switch $SW_7$ so as to operate this switch. A spring acts on the lever 72 to urge the latter in a clockwise direction, as viewed in FIG. 19.

Figure 26:
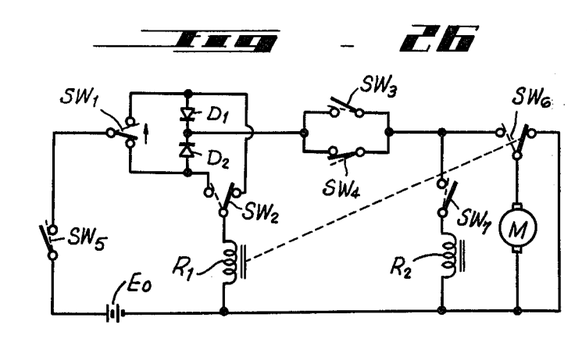
FIG. 26 is another embodiment of a wiring diagram, the embodiment of FIG. 26 being utilized with the embodiment of FIG. 19.

This third embodiment operates as follows:

FIG. 26 shows the circuitry of FIG. 24 modified to include the switch $SW_7$ and the electromagnet $R_2$. As is apparent from FIG. 26, when the current source switch $SW_5$ is open, the electromagnet $R_2$ is not energized so that the lever 66 is then in the condition illustrated in FIG. 23. At this time the transmission means is of course disengaged from the pin 43 since end member 39 is in its lower position. Upon closing of the switch $SW_5$, the switch $SW_7$ will be closed, or in other words it will be in its normally closed position, so that the electromagnet $R_2$ becomes energized, attracting the armature 67 so as to turn the lever 66 in a counterclockwise direction in opposition to the spring 70, thus raising the end member 39 so that the transmission means is operatively connected with the pin 43. Thus, with this construction, as will be pointed out below, it is possible to carry out the film-advancing and shutter-cocking operation with the normal lever provided for this purpose at the camera even when the camera is coupled to the transmission means by way of the pin 43.

Figure 22:
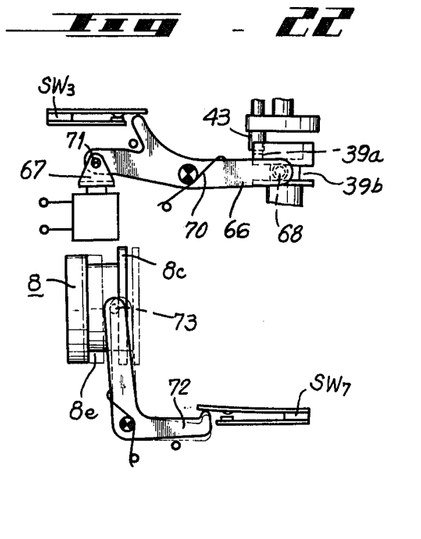
FIG. 22 shows this structure in a subsequent position.

Upon completion of the film-winding and shutter-cocking operations as pointed out above, and as shown in FIG. 22, the movement of the steel ball 10 out of the recess 11a will cause the flanged member 8 to move to the left so that the switch $SW_7$ is opened by way of the action of the lever 72. As a result the electromagnet $R_2$ becomes deenergized and the attraction of the armature 67 is terminated. However, inasmuch as the movement of the steel ball out of the recess 11a has not yet been completed, the point of engagement between end member 39 and its recess 39a and the pin 43 under the action of the friction force up component of the driving force P is effective as shown in FIG. 13 and described above. Thus, the lever 66 and the end member 39 will still remain at this time in the position shown in FIG. 22.

Figure 23:
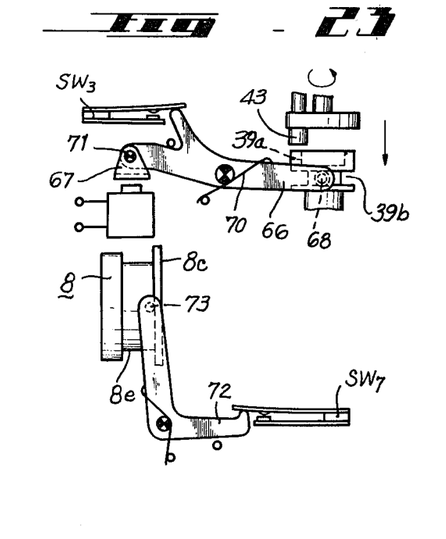
FIG. 23 shows this structure in a still further position.

However, upon completion of the movement of the steel ball 10 of the recess 11a, the rotary driving force P terminates and becomes non-existent. Therefore, due to the action of the operating force $P_1$ of the spring 70, and through the pin 68 of the lever 66, the end member 39 is moved downwardly and disengaged from the transmission pin 43 in opposition to the returning force $P_0$ which returns the pin 43 to its starting position, and now the lever 66 will act on the switch $SW_3$ in order to open the latter as indicated in FIG. 23. Upon disengagement of the transmission from the pin 43 the pin 43 returns to its original position due to the action of the force $P_0$, thus closing the switch $SW_4$. Thus these switches $SW_3$ and $SW_4$ are the same as described above in connection with the embodiment of FIG. 8.

Figure 20:
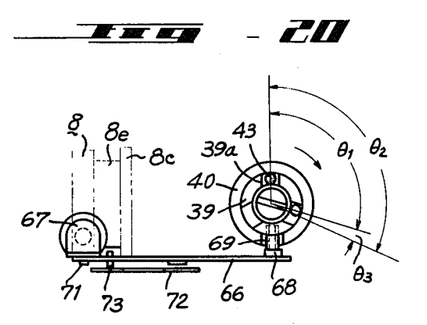
FIG. 20 is a schematic plan view of that part of the structure of FIG. 19 which is connected to the transmission.
Figure 21:
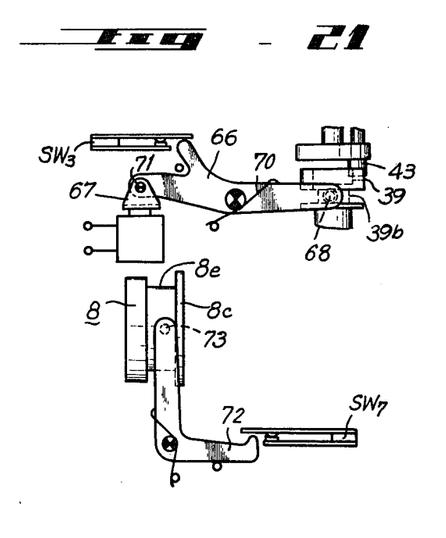
FIG. 21 shows the switch operating levers and transmission controlling lever of FIG. 19 in a first position.

Now when the operator moves the switch $SW_1$ from the solid to the dotted line position shown in FIG. 26, the switch $SW_2$ has been situated in its solid line position in the manner described above, so that the current is supplied to the motor and the driving power is transmitted in the same way as described above, bringing about return of the ball 10 into the recess 11a and causing the tripping of the shutter as described above. At the same time, the movement of the flanged member 8 to the right from the solid to the dot-dash line position shown in FIG. 22 permits the switch $SW_7$ to return to its normally closed position since the lever 72 will no longer maintain in this switch in its open position, and accordingly the electromagnet $R_2$ becomes energized with the result that the core of the electromagnet attracts the armature 67 and swings the lever 66 in opposition to the spring 70 in a counterclockwise direction as viewed in the drawings. As a result, the pin 68 of the lever 66, and in particular the extension 69 thereof in the groove 39b will raise end member 39 back up to its position of driving engagement with the pin 43, so that in the same way as with the embodiment of FIG. 8 the parts will return to their initial positions as indicated in FIGS. 20 and 21. Now the shutter will be cocked and the film advanced in preparation for the next exposure, as pointed out above, upon release of the manually operable switch $SW_1$ which automatically returns when released to its solid line position.

As pointed out above, according to the present invention, the shaft 45 of the camera mechanism for advancing the film and cocking the shutter is connected to the source of power derived from the motor 1 through the slip-joint mechanism thus achieving an automatic film-advanceing structure. In addition to the mechanism for transmitting the driving power there is provided the reversed rotation of the driving power transmission. Also, during the interval between completion of film advance and shutter tripping, it is possible to engage or disengage the connection between the camera structure and the motor-driven structure of the invention, as is apparent with the first and third embodiments of FIGS. 8 and 19, respectively.

The structure of the invention provides a number of advantages. In the first place, upon completion of film advance and shutter cocking the transmission to the structure for advancing the film and cocking the shutter is disconnected and the shutter-cocking member will return by itself to its starting position, so that the required time for the operation is considerably shortened and it becomes possible to carry out a high-speed series of cycles of operations with the automatic structure of the invention. In the second place inasmuch as the shutter-cocking member returns by itself to its starting position it is not necessary to provide a reversed rotation of the drive in order to provide a mechanism for achieving a reversed rotation of the shutter-cocking member, so that the structure of the invention is greatly simplified as compared to previously known structures. In the third place, even if the automatic structure of the invention is coupled to the camera it is still possible to carry the photographing operations by way of the camera structure itself, as pointed out above.

With a different arrangement where the return of the shutter-cocking member to its starting position the automatic device is required to make a reversed rotation or has a reversed rotation mechanism for this purpose, the automatic drive is coupled directly to the camera structure so that while the film advance can be carried out with the film-advance lever of the camera, on the other hand, with respect to the return of the shutter-cocking member to its starting position, inasmuch as the transmission pin of the camera is coupled to the automatic structure it is almost impossible to carry the returning action of the entire automatic mechanism with the relatively weak return force $P_O$ of the shutter-cocking element itself. However, when this element does not return to its starting position it is impossible to trip the shutter, so that it is clear that these structures have considerable disadvantages as contrasted with the structure of the invention. A further disadvantage of the structure of the type referred to above is that in order to provide for single exposures in the normal way with the camera it is essential to disconnect the motor drive attachment, whereas such a disconnection is not required by the present invention.

It is thus clear that by way of the present invention many drawbacks of the prior art are avoided and a great number of practical advantages are achieved.

What is claimed is:

1. In a camera, combined film-transporting and shutter-cocking means having an end position in which a shutter of the camera is cocked and film in the camera has been advanced to be in position for the next exposure, said combined means also having a starting position displaced from said end position thereof and assumed by said combined means for enabling an exposure to be made, transmission means operatively connected with said combined means for displacing the latter from said starting to said end position thereof with said combined means transporting film and cocking the shutter while being displaced by said transmission means from said starting to said end position, said transmission means having the capability of releasing said combined means after the latter has reached said end position thereof and said combined means responding to release from said transmission means for automatically returning to said starting position, operating means operatively connected with said transmission means for operating the same both to displace said combined means from said starting to said end position and to release said combined means for return from said end position to said starting position thereof, said operating means having only a one-way drive connection with said transmission means for operating the latter in one direction only, and said operating means including a motor-driven drive means for responding automatically to reaching of said end position by said combined means for terminating the operation of said transmission means, and for acting on said transmission means to disconnect the latter from said combined means so as to release the latter for automatic return to said starting position thereof, so that an exposure may be made prior to the next connection of said transmission means to said combined means and the next operation of said operating means for displacing said combined means from said starting to said end position thereof.

2. The combination of claim 1 and including a shutter-tripping means for tripping the shutter to make an exposure when said combined means is in said starting position thereof, and actuating means cooperating with shutter-tripping means for actuating the latter to trip a shutter of the camera, said actuating means being operatively connected with said operating means to be operated thereby when said combined means reaches said starting position thereof.

3. The combination of claim 2 and wherein said operating means cooperates with said transmission means for operatively connecting the latter with said combined means substantially simultaneously with operation of said actuating means to bring about tripping of the shutter by said shutter-tripping means, so that immediately after an exposure has been made, said transmission means is again in a position for displacing said combined means from said starting to said end position in preparation for the next exposure.

4. The combination of claim 3 and wherein said operating means automatically operates said transmission means to displace said combined means from said starting to said end position thereof in response to operation of said actuating means to trip the camera shutter and reestablishment of the connection between said transmission means and said combined means, so that upon completion of the displacement of said combined means from said starting to said end position thereof said operating means again brings about automatic release of said combined means from said transmission means so that said combined means again returns automatically to said starting position thereof, whereby the structure is again prepared for the next exposure.

5. The combination of claim 4 and wherein said motor-driven drive means of said operating means includes a rotary output means operatively connected through said one-way drive permanently with said transmission means, a rotary input assembly directly driven by the motor of said motor-driven drive means, and slip-joint means connected between said output and input assemblies for transmitting a drive from said input to said output assembly while responding to reaching of said end position by said combined means for displacing said input assembly away from said output assembly and for terminating the transmission of the drive from said input to said output assembly, and electrical circuit means connected with said motor of said motor-driven drive means for energizing said motor, said electrical circuit means including a switch means operatively connected with said input assembly for responding to displacement thereof away from said output assembly upon terminating of the transmission of a drive thereto for terminating the energizing of said motor.

6. The combination of claim 5 and wherein said circuit means includes a manually operable switch means for energizing said motor subsequent to the stopping thereof by displacement of said input assembly away from said output assembly, said input assembly when thus further driven upon closing of said manually operable switch means acting through said slip-joint means for returning to a position in driving engagement with said output assembly, and said input assembly while returning to said position for driving said output assembly cooperating with said actuating means for operating the latter to actuate said shutter-tripping means for making an exposure and also cooperating with said transmission means for placing the latter again in driving engagement with said combined means.

7. The combination of claim 6 and wherein said actuating means includes a swingable lever having a pin projecting from a portion thereof, said input assembly including a rotary drive member having a flange formed with a gap receiving said pin of said lever, and said input assembly when displaced away from said output assembly moving said flange beyond said pin, said motor-driven drive means including means which responds to displacement of said input assembly away from said output assembly for driving said rotary flanged member to a position where said gap thereof no longer is in line with said pin, so that upon return of said input assembly to said position of driving engagement with said output assembly said flange engages said pin to swing said lever, and the latter upon swinging actuating said shutter-tripping means.

8. The combination of claim 7 and wherein said motor operates only in one direction of rotation, and said motor-driven drive means including at said means which responds to movement of said input assembly away from said output assembly a structure for reversing the direction of rotation both of said output assembly and said flanged member with the latter reverse rotation continuing until the motor is unenergized by actuation of said switch means of said electrical circuit means in response to movement of said input assembly away from said output assemnbly with the reverse rotation of said flanged member and said output means also continuing upon operation of said manually operable switch means until said input assembly again assumes its position of driving engagement with output assemnbly, said one-way drive connection between said output assembly and transmission means preventing operation of the latter during the reverse direction of rotation of said output assembly.

9. The combination of claim 8 and wherein said slip-joint means between said input and output assembly includes a pair of end plates of said assemblies which are situated directly next to each other when said input assembly is in driving engagement with said output assembly, said end plates respectively being formed with openings, and a ball situated in both of said openings when said end plates are next to each other, said ball responding to reaching of said end position by said combined means for moving out of said opening of said end plate of said output assembly while pushing said input assembly away from said output assembly and rolling along a surface of said end plate of said output assembly until again being received in said opening thereof.

10. The combination of claim 5 and wherein said transmission means has next to said combined means an end member movable toward said combined means for assuming a driving engagement with respect thereto and away from said combined means for disconnecting said transmission means from said combined means, and moving means cooperating with said end member of said transmission means and with said input assembly of said operating means for responding automatically to movement of said input assembly away from said output assembly to move said end member away from said combined means for disconnecting said transmission means from said combined means, and said moving means responding automatically to return said input assembly to said position of driving engagement with said output assembly for returning said end member into driving connection with said combined means.

11. The combination of claim 10 and wherein said combined means includes a rotary shaft turnable about its own axis and carrying a transmission pin spaced from said axis for turning with said shaft around said axis, said end member being movable along said axis of said shaft toward and away from the latter and being formed with a plurality of recesses distributed about said axis for respectively receiving said transmission pin, said starting and end positions of said combined means situating said transmission pin thereof respectively at positions angularly spaced from each other about said axis by an angular distance which is a predetermined fraction of a complete circle circle around said axis and said member being formed formed with recesses directed toward said combined means at the same radial distance from said axis as the transmission pin and each spaced from the next by an angular distance equal to said fraction of said circle so that when said combined means returns to said starting position thereof a recess of said end member is in line with said transmission pin to receive the latter when said end member is displaced into driving engagement with said combined means.

12. The combination of claim 11 and wherein said moving means includes a swingable lever means having a portion situated in the path of movement of said input assembly away from said output assembly to be turned by said input assembly to a position tending to displace said end member away from said combined means, said lever means including a pair of levers pivotally connected to each other and a spring urging said levers with respect to each other to a position where they operate as a single lever, said spring being tensioned upon turning of said lever means by said input assembly when the latter moves away from said output assembly for tending to displace said end member away from said transmission pin, the latter being in frictional engagement with said end member at a recess thereof with a force great enough to prevent displacement of said end member away from said pin until transmission means drives said combined means to said end position thereof, whereupon said spring acts through said levers of said lever means to displace said end member away from said transmission pin to disconnect said transmission means from said combined means to release the latter for return to said starting position thereof.

13. The combination of claim 12 and wherein an additional spring means cooperates with said lever means for swinging the latter to act on said end member to displace the latter back into driving engagement with said combined means when said input assembly returns to its position of driving engagement with respect to said output assembly.

14. The combination of claim 10 and wherein said moving means includes a swingable lever means having a portion situated in the path of movement of said input assembly away from said output assembly to be turned by the movement of said input assembly away from said output assembly to a position displacing said end member away from said combined means to release the latter for return to said starting position thereof, said lever means including one lever directly engaging said input assembly when the latter moves away from said output assembly and a second lever pivotally connected to said one lever and directly connected with said end member, said second lever being pivotally connected to said one lever and a spring yieldably holding said second lever in a predetermined position with respect to said one lever and acting on said second lever for returning said end member to its position of driving engagement with respect to said combined means, said input assembly when returning to its position of driving engagement with respect to said output assembly releasing said one lever for turning movement to a position where said spring acts on said second lever to turn the latter with respect to said one lever for displacing said end member back to its position of driving engagement with respect to said combined means, and an additional spring acting on said one lever for returning the latter to a rest position where said second lever returns said end member to said position of driving engagement with respect to said combined means upon return of said input assembly into its position of driving engagement with respect to said output assebly.

15. The combination of claim 10 and wherein said moving means includes a swingable lever operatively connected with said end member for displacing the latter between its positions in and out of driving engagement with said combined means, a spring cooperating with said swingable lever for urgine the latter to a position displacing said end member away from said combined means to release the latter for return to said starting position thereof, said lever carrying an armature, a solenoid cooperating with said armature for attracting the latter to a position turning said lever in opposition to said spring to a location situating said end member in driving engagement with said combined means, and said electrical circuit means including a switch in the circuit of said solenoid for energizing the latter when said switch is closed, and a second lever cooperating with said switch for controlling the latter, said second lever having a portion situated in the path of movement of said input assembly away from said output assembly to be turned by said input assembly to a position opening said switch for deenergizing said solenoid so that said spring will then act on said lever to displace said end member away from said conbined means to release the latter for return to said starting position thereof, said second lever releasing said switch so that the latter assumes a closed position, upon return of said input assembly to driving engagement with said output assembly, and said latter switch when assuming said closed position thereof energizing said solenoid so that the latter acts through said lever in opposition to said spring for returning said end member to said position of driving engagement with respect to said combined means.

16. The combination of claim 10 and wherein said electrical circuit means includes a pair of parallel-connected switch means situated in the circuit of said motor so that the latter can be energized only when one of said pair of parallel-connected switch means is closed, one of said pair of parallel-connected switch means being a normally closed switch and the other being a normally open switch, and said moving means cooperating with said normally closed switch for opening the latter when said moving means moves said end member away from said combined means for disconnecting said transmission means from said combined means, while said combined means cooperates with said normally open switch for closing the latter only upon return of said combined means to said starting position thereof, so that during movement of said combined means from said end position to said starting position thereof, the motor cannot be energized.

* * * * *